(12) United States Patent
Assmann

(10) Patent No.: US 7,128,226 B2
(45) Date of Patent: Oct. 31, 2006

(54) LIFTING DEVICE WITH A GUIDE DEVICE FOR LOADS

(75) Inventor: Roland Assmann, Budingen (DE)

(73) Assignee: Siemens AG (DE)

( * ) Notice: Subject to any disclaimer, the term of this patent is extended or adjusted under 35 U.S.C. 154(b) by 101 days.

(21) Appl. No.: 11/043,491

(22) Filed: Jan. 26, 2005

(65) Prior Publication Data

US 2005/0186058 A1  Aug. 25, 2005

Related U.S. Application Data

(63) Continuation of application No. 10/148,060, filed as application No. PCT/DE00/03965 on Nov. 9, 2000, now abandoned.

(30) Foreign Application Priority Data

Nov. 24, 1999 (DE) ................. 199 57 468
Nov. 9, 2000 (WO) ..................... PCT/DE00/03965

(51) Int. Cl.
  *B66C 17/00* (2006.01)
(52) U.S. Cl. ............... 212/273; 212/319; 212/334; 414/626
(58) Field of Classification Search ........ 212/272–273, 212/319, 333–335; 414/626
See application file for complete search history.

(56) References Cited

U.S. PATENT DOCUMENTS

| | | | |
|---|---|---|---|
| 3,082,893 A | 3/1963 | Hollings et al. | 414/626 |
| 3,580,804 A | 5/1971 | Paget | 376/271 |
| 4,360,110 A | 11/1982 | Sigman et al. | 212/318 |

FOREIGN PATENT DOCUMENTS

| | | |
|---|---|---|
| CH | 433645 | 9/1967 |
| DE | 3414701 A1 | 10/1985 |
| DE | 4219370 A1 | 12/1993 |
| DE | 9408846.2 | 10/1994 |
| DE | 9408847.0 | 10/1994 |

(Continued)

OTHER PUBLICATIONS

Prospect "Ketten Reaktionen"—"No Limits.", company: igus.

(Continued)

*Primary Examiner*—Thomas J. Brahan
(74) *Attorney, Agent, or Firm*—Van Dyke, Gardner, Linn & Burkhart, LLP

(57) ABSTRACT

The invention relates to a lifting device for loads, especially to a suspension lift for vehicles or vehicle parts. Said lifting device comprises load receiving means (14) with at least one longitudinal beam (17) mounted on the load receiving means (14) and substantially aligned in the lifting and lowering direction (S). The device further comprises at least one guide element (15) mounted on the base frame (5) for laterally guiding the longitudinal beam and thus the load receiving element (14) and a lifting gear (19) for performing the lifting and lowering movement of the load receiving means (14). The aim of the invention is to provide a lifting device that facilitates an ample lifting/lowering movement of the load while considerably reducing the overall height of the lifting device. To this end, the longitudinal beam (17) is subdivided in at least two sections (17a, 17b, 17c) in the manner of a link chain. Said sections are interlinked so as to be foldable transversally to the lifting and lowering direction. In the lifted state of the load receiving means (14 ), the upper sections (17b, 17c) of the longitudinal beam (17) are folded and in the lowered state of the load receiving means (14) the upper sections (17b, 17c) of the longitudinal beam (17) are unfolded.

28 Claims, 5 Drawing Sheets

FOREIGN PATENT DOCUMENTS

Figure 1:
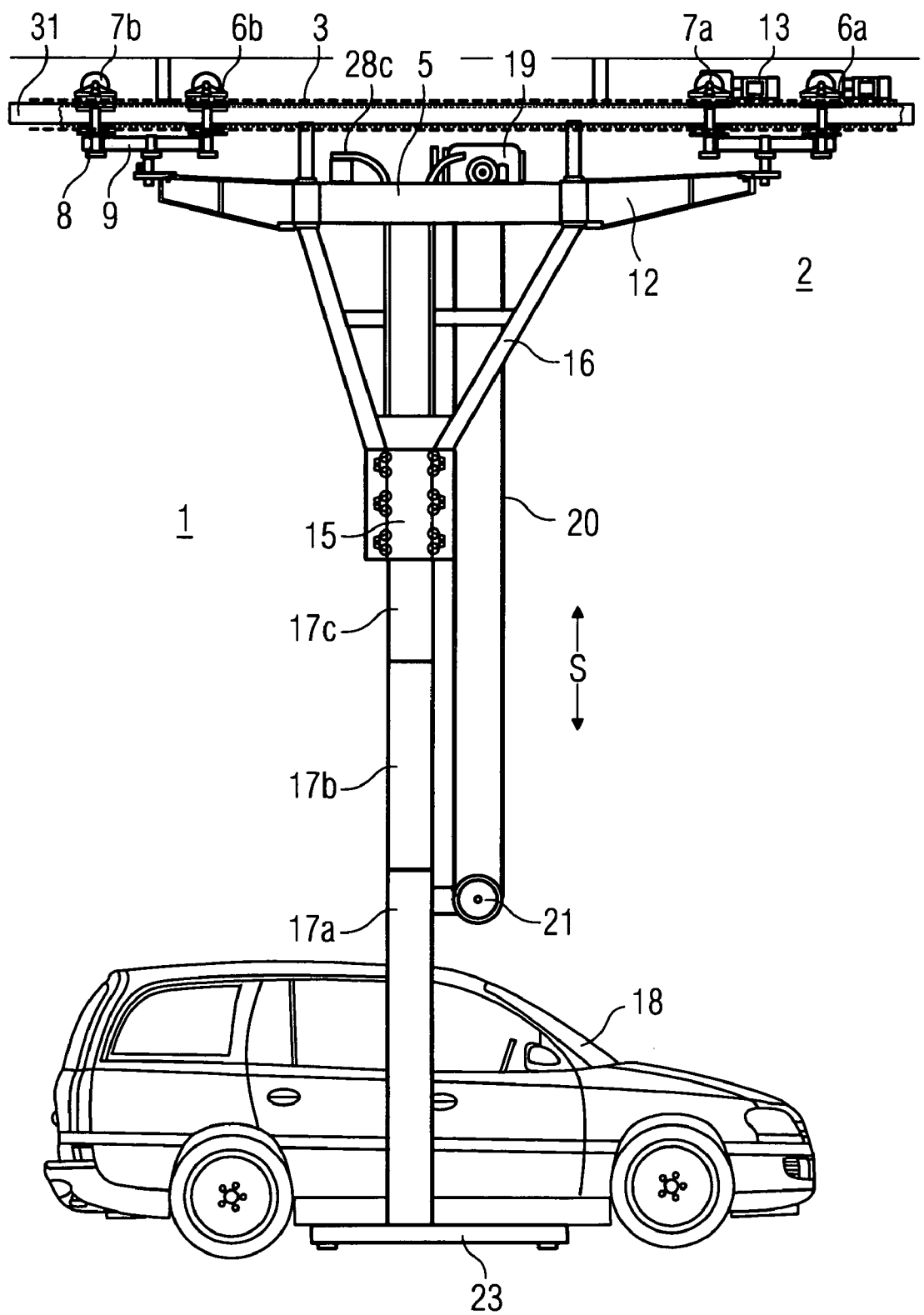

| | | | |
|---|---|---|---|
| DE | 4326563 | 2/1995 | |
| GB | 651858 | 4/1951 | ................ 414/626 |
| SU | 806587 | 2/1981 | ................ 212/319 |
| SU | 988747 | 1/1983 | ................ 212/273 |

OTHER PUBLICATIONS

3 Photos "Doppelspur—Langhubgehänge", company: Mannesmann Dematic.

Search Report for the International application of the present application, namely PCT Application PCT/DE00/03965.

LIFTING DEVICE WITH A GUIDE DEVICE FOR LOADS

This application is a continuation application of U.S. application Ser. No. 10/148,060, filed on May 24, 2002, now abandoned by Dr. Roland Asssmann, entitled LIFTING DEVICE WITH A GUIDE DEVICE FOR LOADS, which is a national stage application of International Application No. PCT/DE00/03965, filed on Nov. 9, 2000 which are incorporated by reference in their entireties.

DESCRIPTION

The invention relates to a lifting device with a guide device for loads according to the preamble of claim 1.

German utility model DE 94 08 847 has already disclosed a height-adjustable supporting device, such as, for example, a C hook or a scissors-type suspension lift. The supporting device is part of a rail vehicle of an overhead electric conveyor which is used, inter alia, in automobile manufacturing in order to transport vehicle parts and the vehicle to be manufactured in its respective stage of manufacture between the individual assembly locations and during assembly. In this connection, it is advantageous if the supporting device for the vehicle being assembled is height-adjustable, since by this means and with simple, horizontal laying of the rails for the overhead electric conveyor, the supporting device can be lowered together with the rail vehicle into the assembly region. Since assembly operations of this type are frequently automated, precise positioning of the rail vehicle and therefore of the supporting device is required. Guidance of the supporting device in the direction of travel of the rail vehicle and also transversely thereto therefore has to be ensured via guide elements; simply suspending the supporting device in traction means is not sufficient.

A height-adjustable supporting device suitable for this purpose has already been described in the above-mentioned German utility model DE 94 08 847. The load receiving means for the vehicle to be manufactured and the vehicle parts is moveable here in the lifting and lowering direction and, in addition, is guided laterally via three telescopic sections which can be displaced in one another. Accordingly, in the extended state the lowermost end of the innermost telescopic section is connected to the load receiving means and the upper end of the outer telescopic section is connected to the rail vehicle. In this case, the telescopic sections are aligned essentially vertically with their longitudinal extent. The telescopic sections are retracted and the load receiving means is therefore lifted via a traction cable which acts on the innermost telescopic section and is connected to a lifting gear arranged on the rail vehicle. The load receiving means is lowered and the telescopic sections are therefore extended by the traction means being relaxed with a simultaneous effect of gravitational force on the telescopic sections and the load receiving means.

With regard to the design of the lifting device with the three-part telescopic device, it should be noted that although a large lift is achieved by this means, the telescopic sections have to be guided with regard to one another in a complex manner in order to enable the load receiving means to be positioned with little play. Also, by means of the central arrangement of the telescoping device on the rail vehicle, an overhead monorail conveyor is connected to a sharply eccentric arrangement of the load receiving means. This results in high moments in the guide elements requiring an appropriate stiffening of the base frame of the rail vehicle.

The frame-shaped receiving means, which is arranged on the telescoping device and is intended for the vehicles and vehicle parts, also has cross beams which are seemingly arranged below the load. These cross connections have proven disadvantageous particularly when lowering the vehicle body onto the chassis during manufacturing. The central telescopic section is also not forcibly guided and so may remain stuck, for example during lowering of the receiving means, without it being possible for this to be recognized by means of a slack-cable disconnection.

Furthermore, German utility model DE 94 08 846 discloses a further height-adjustable supporting device of similar construction. Here, however, instead of the telescoping device, a scissors-type device is provided between the rail vehicle and the load receiving means. The drive for the lifting and lowering movement again takes place via a traction means which acts on the load receiving means and interacts with a lifting gear arranged on the rail vehicle.

The design of the lifting device with the scissors-type system has proven very complex in terms of structure, since, in order to pass the guide forces on to the load receiving means, the latter has to have a structurally complex base frame. If particularly large lifts of over 4 m, for example, are required, the use of scissors-type elements has proven disadvantageous, since the latter would then be approximately 6 m long. Also, for guiding the lower ends of the scissors-type elements, a lower frame is required, which frame is structurally complex, projects in the direction of travel of the rail vehicle and obstructs the accessibility to the engine and trunk of the vehicle body. Furthermore, it has proven disadvantageous to arrange the lifting gear for the scissors-type system at the rear end, as seen in the direction of travel, since the length of the rail vehicle is increased as a result. This also requires the use of a further deflection pulley for the lifting cable.

The invention is based on the object of providing a lifting device with a guide device for loads, which device has a large lifting/lowering movement of the load with a simultaneously small overall height of the lifting device.

This object is achieved by a lifting device having the features mentioned in claim 1. Advantageous refinements of the invention are specified in subclaims 2 to 14.

The lifting device, which is under discussion, for loads is distinguished in an advantageous manner in that firstly, in the lowered state of the load receiving means, the load receiving means is guided transversely to the lifting and lowering direction by means of a rigid longitudinal beam running in the lifting and lowering direction, and, secondly, this rigid longitudinal beam is divided in the manner of a link chain into at least two sections which are interconnected foldably transversely to the lifting and lowering direction via a respective joint. This has the effect that, in addition to the rigid guidance of the lowered load receiving means, a lateral folding of the longitudinal beam is possible, in order thus to permit the load receiving means to be lifted over a large lifting path with, at the same time, a low overall height of the lifting device. The folding and unfolding movement of the upper sections of the longitudinal beam is achieved in a particularly simple manner via a guide rail which is arranged on the base frame of the lifting device. For this purpose, the guide rail has a straight section which is adjacent to, and begins at, the upper end of the guide element, runs essentially vertically and is adjoined by a curved section which leads into a further straight section aligned essentially transversely to the transverse and lowering direction. Carry-along elements which are arranged at the respective, upper ends of the upper sections of the longitudinal beams engage in this guide rail. When the load receiving means is lifted, the carry-along elements are therefore guided in the guide rails and thus initiate the folding movement of the sections of the longitudinal beam at a time at which said sections have left the guide element and are therefore no longer subjected to the load. At this time, those sections of the longitudinal beam which are positioned further downward realize the guiding tasks. The carry-along elements are preferably designed as pins with a roller which moves in the guide rail mounted at the end thereof.

In order to use the lifting device for lifting and lowering vehicle bodies, the arrangement of two longitudinal beams which run parallel to and at a distance from each other and in each case have three sections, has turned out to be advantageous. In this case, the lower sections are connected to one another, preferably in the region of their upper ends, via a cross beam in each case. Receiving means for the load are arranged at the lower ends of the lower sections of the longitudinal beams. An upside-down, U-shaped load receiving means is therefore formed by the receiving elements of part of the lower sections of the longitudinal beams and of the cross beam.

A load receiving means designed in such a manner and the associated lifting device having the foldable longitudinal beams is suitable in particular for use in automobile manufacturing, since there, at the time of the "coming together" during the automobile manufacturing, the vehicle body which is suspended on the load receiving means has to be lowered onto the chassis. This assembly process can be carried out in a particularly advantageous manner using the above-described lifting device. The precision, which is necessary for this purpose, in guiding the vehicle body is achieved by the two rigidly guided longitudinal beams.

Furthermore, it has proven advantageous that the guide element for the longitudinal beams does not grip completely around the latter in each case in order to guide it. A circumferential gap is preferably retained, so that the longitudinal beam is gripped only in a region of approximately 230 to 310°, preferably 300°. By this means, with the use of two longitudinal beams which run parallel to each other and are connected to a cross beam, the cross beam can also be raised beyond the level of the guide elements, since said cross beam can be guided through the guide element in the region of the circumferential gap. The cross beam is also preferably suitable for a central engagement of a traction means for the lifting gear arranged on the base frame of the lifting device.

The guide element is preferably provided with guide rollers which are rotatable about horizontal axes and can be positioned on the surface of the longitudinal beam via eccentric axes. Instead of guidance via rollers, a sliding guide would also be conceivable here. The profile of the longitudinal beam is preferably designed as a round tube. It is also conceivable to configure the longitudinal beam with a prismatic cross section, in which case the rollers roll along the side surfaces.

For the folding and unfolding movement of the sections of the longitudinal beam with respect to one another, said sections are connected to one another via joints having pivot axes aligned transversely to the lifting and lowering direction.

For the previously described use in the automobile industry, the base frame of the lifting device is preferably part of a rail vehicle which is moveable on at least two rails arranged next to each other and has running-gear mechanisms which are arranged on the base frame and can be pivoted about vertical axes.

Figure 2:
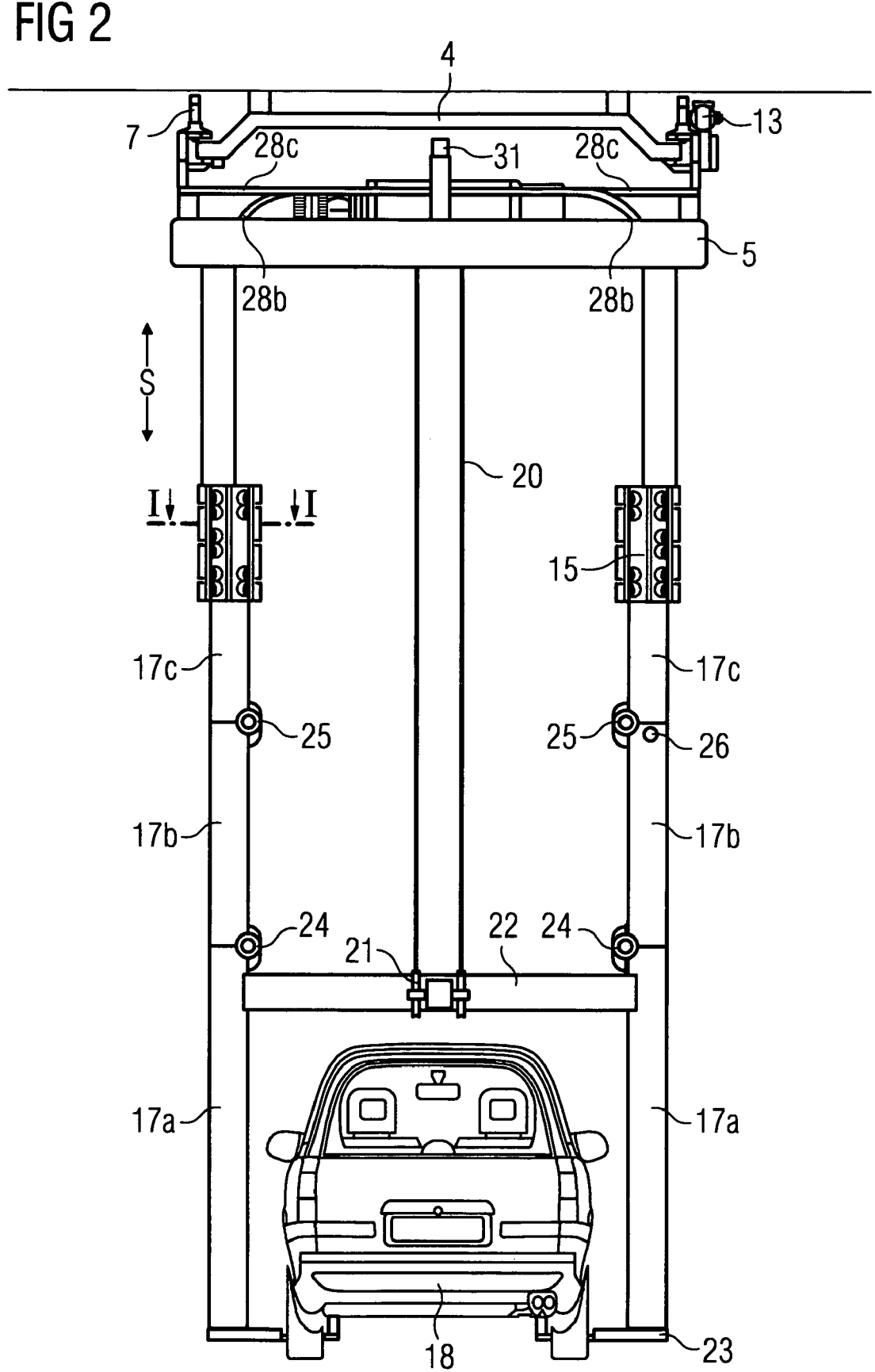
Figure 3:
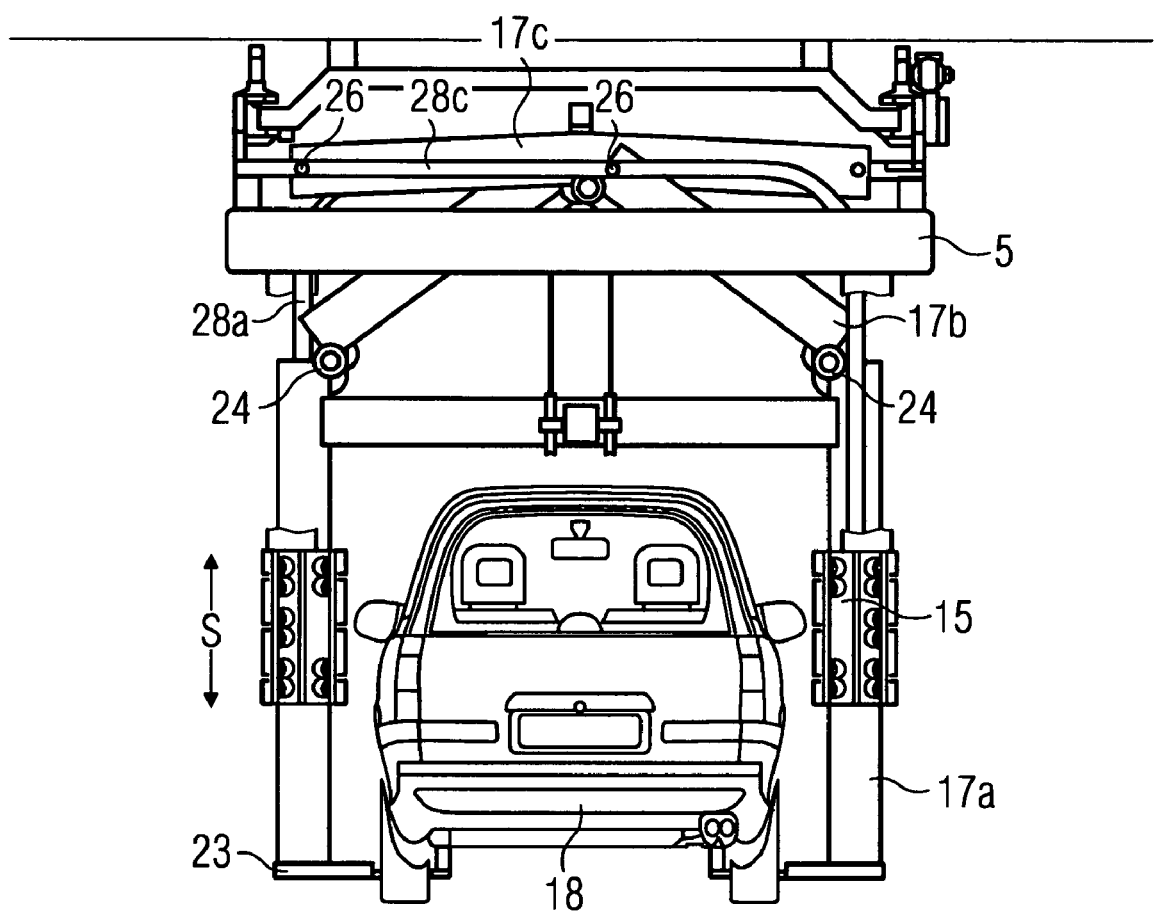
Figure 4:
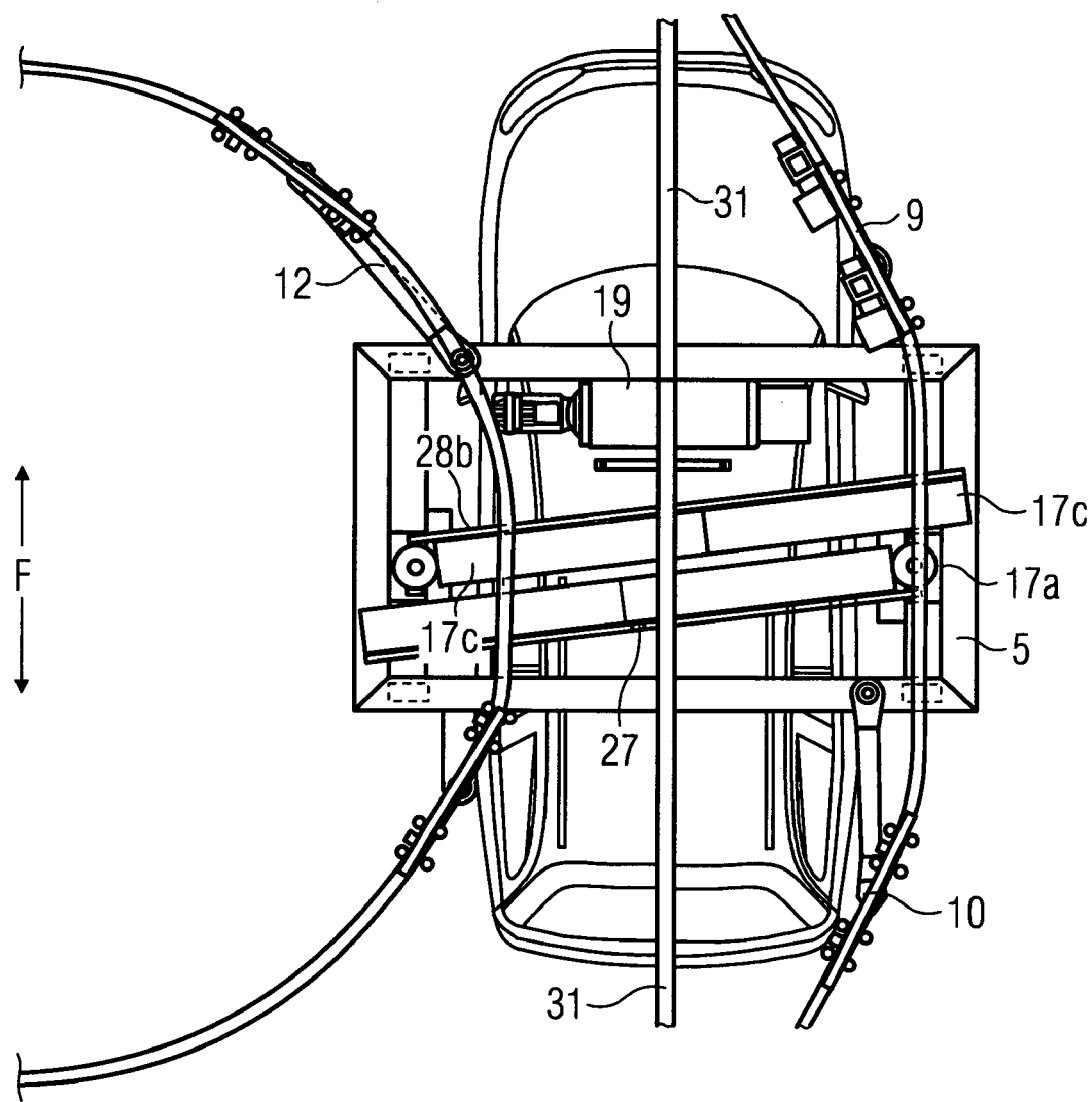
Figure 5:
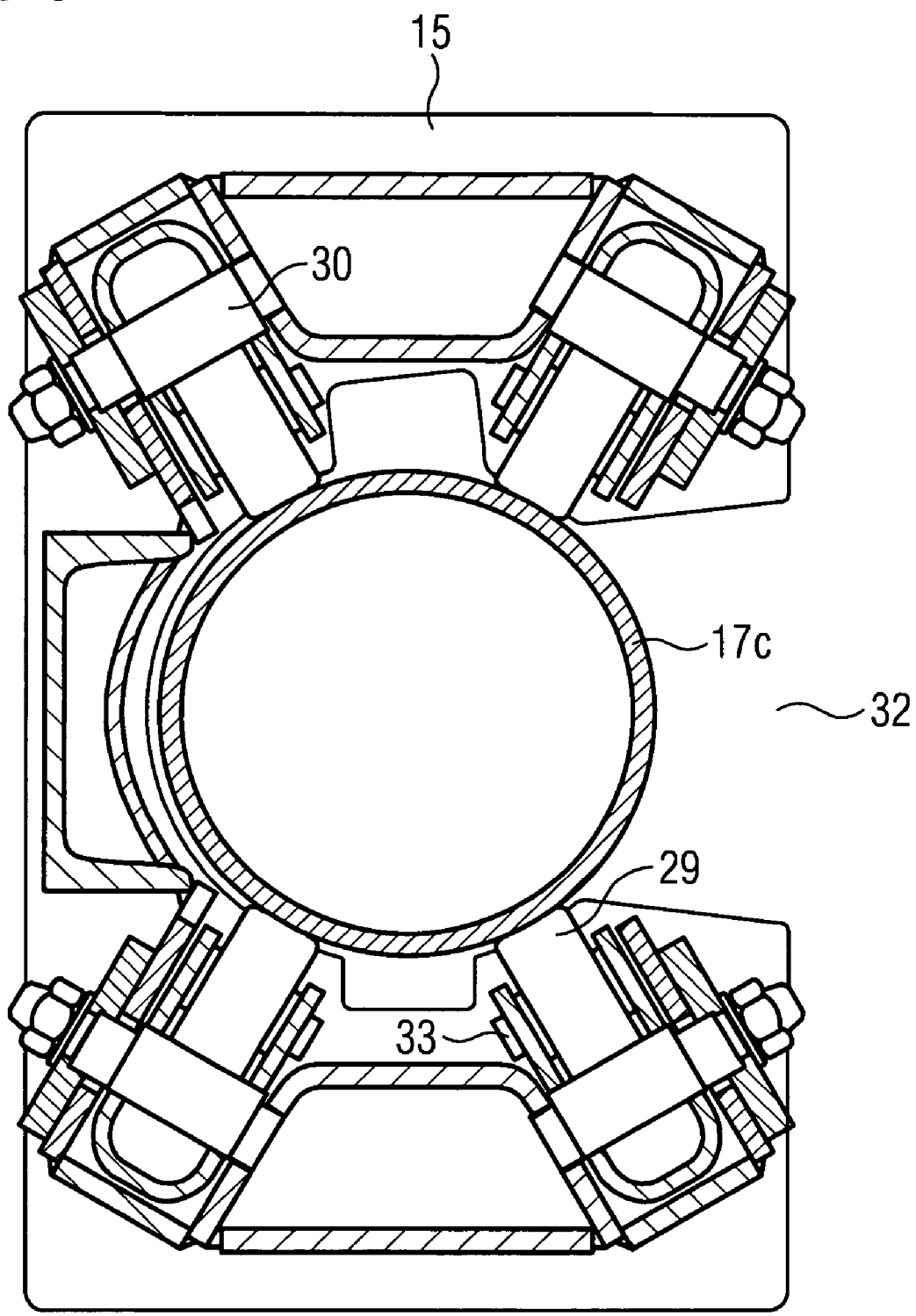

An exemplary embodiment of the invention will be described in greater detail below with reference to a drawing, in which:

FIG. 1 shows a view of a lifting device as part of a double-rail overhead electric conveyor having a curve-going rail vehicle, FIG. 2 shows a side view of FIG. 1, FIG. 3 shows a further side view of FIG. 1, but with the load receiving means lifted, FIG. 4 shows a plan view of FIG. 1, and FIG. 5 shows a sectional view of FIG. 2 along the section line I—I.

FIG. 1 shows a view of a lifting device 1 as part of a transporting system having a curve-going rail vehicle 2. Since the transporting system is designed as a "double-rail overhead electric conveyor", two rails 3 which are aligned next to each other and, to the greatest possible extent, parallel to each other and on which the rail vehicle 2 moves, are provided (see also FIG. 4). The rails 3 are conventionally fastened via a suspension means 4 to the ceiling structure of a manufacturing hall (see FIG. 2).

First of all, the rail vehicle 2 will be described in greater detail with reference to FIG. 1 and FIG. 4, which shows a plan view of FIG. 1. The rail vehicle 2 essentially comprises a base frame 5 which is supported on the rails 3 via eight driven and non-driven running-gear mechanisms 6. The non-driven running-gear mechanisms 6b are constructed essentially in each case from a running wheel 7b and four guide wheels 8. The driven running-gear mechanisms 6a essentially comprise in each case one driving wheel 7a and eight guide wheels 8. The guide wheels 8 run laterally on the upper and lower flanges of the rail 3, which is preferably designed as an I-beam. The driving wheels 7a and the running wheels 7b roll along the upper flange of the rail 3. Two of the running-gear mechanisms 6 in each case are connected to an intermediate beam 9 in a manner such that they can pivot in each case about vertical axes 10. On one side of the rail vehicle 2, the intermediate beams 9 are mounted approximately centrally in the region of the front and rear end of the base frame 5, as seen in the direction of travel F, directly via a further vertical axes 11. On the other side of the rail vehicle 2, the intermediate beams 9 are not coupled directly to the base frame 5, but are connected to the base frame 5 via further pivot arms 12. The coupling of the intermediate beams 9 on this side to the base frame 5 via the pivot arms 12 makes it possible for the rail vehicle 2 to also travel around horizontal curves and also to compensate while under way for irregularities with regard to the distance between the rails 3 laid parallel next to each other.

The rail vehicle 2 is preferably driven via an electric drive 13 which is flanged laterally to the running-gear mechanism 6a. The electric drive 13 is connected electrically via current collectors (not illustrated) to a contact line arranged along the rail 3.

In principle, use of the lifting device 1 on a monorail overhead conveyor or in a stationary manner is also possible.

The lifting device 1 for a load receiving means 14 is suspended on the base frame 5 of the rail vehicle 2. The lifting device 1 essentially comprises sleeve-shaped guide elements 15 which are suspended on the lower side of the base frame 5 of the rail vehicle 2 via struts 16. It can be seen from FIG. 1 that the alignment of the guide element 15 is selected in such a manner that a longitudinal beam 17 can be moved through the sleeve-shaped guide element 15 in the lifting/lowering direction S, i.e. essentially in the vertical direction, and can be guided by said guide element. The longitudinal beam 17 is fastened at its end facing away from the guide element 15 to the load receiving means 14 for the load 18, for example a motor vehicle. Other loads, such as, for example, pallets, skeleton containers or containers, can also be transported by this means.

Furthermore, it can be seen from FIG. 1 that a lifting gear 19 is arranged on the base frame 5, via which gear the load receiving means 14 can be lifted and lowered. For this purpose, the lifting gear 19 is connected to the lower region of the longitudinal beam 17 via a traction means 20. The use of a chain or a strap as the traction means 20 is also possible. The connection to the load receiving means 14 takes place via a deflection pulley 21 acting on the cross beam 22. The end of the traction means 20 is fastened to the base frame 5 in the region of the lifting gear 19.

The lifting device 1 and its precise construction and the guiding of the longitudinal beams 17 will be explained in greater detail with reference to the further FIGS. 2 and 3. It can be seen from FIG. 2 that there are two longitudinal beams 17 which run parallel to and at a distance from each other. Each longitudinal beam 17 is subdivided, seen in the longitudinal direction, into three sections 17a, 17b and 17c in the manner of a link chain. A division of each beam 17 into only two or more than three sections 17a, 17b and 17c is also possible. The sections 17a, 17b and 17c are connected to one another via joints 24 and 25. The joints 24 and 25 have pivot axes 34 running in each case transversely to the lifting and lowering direction S, with the result that the upper sections 17b and 17c can be folded laterally during the lifting of the load receiving means 14. The lower sections 17a of the longitudinal beams 17 are connected to one another at their upper ends via a cross beam.

It can also be seen that the deflection pulleys 21 for the traction means 20 designed as steel cables are mounted on the cross beam 22. Arranged on the lower sections 17a of the longitudinal beams 17 are respective receiving means 23 which are in each case rigid or can be pivoted about the vertical axis, support the load 18 in the form of a motor vehicle or motor vehicle part in a suitable manner and therefore form part of the load receiving means 14. The load receiving means 14 is thus formed from the lower sections 17a of the longitudinal beam 17, the cross beam 22 and the receiving means 23 and has, as seen in the direction of travel F of the rail vehicle 2, the shape of an upside-down U. The load receiving means 14 can be lifted via the lifting device 1 to an extent such that the lower sections 17a of the longitudinal beam 17 are moved virtually completely into the guide elements 15 or through the latter (see FIG. 3). FIG. 3 illustrates only a lifted position, but not the uppermost position of the load receiving means 14. The load receiving means 14 can be lifted sufficiently far for the longitudinal beams 17b and 17c to be arranged such that they lie horizontally to the greatest possible extent and for the receiving means 23 to be adjacent to the lower side of the guide elements 15.

This lower section 17a of the longitudinal beam 17 is upwardly adjoined by the two further sections 17b and 17c of the longitudinal beam 17. The upper end of the section 17a is connected via the joint 24 which is designed in the manner of a hinge joint having a pivot axis 34 aligned horizontally and in the direction of travel F. The upper end of the second section 17b of the longitudinal beam 17 is connected to the lower end of the third section 17c of the longitudinal beam 17 in turn via a joint 25 comparable to the joint 24. Since the joints 24 and 25 are designed as hinge joints, starting from their position in which they are arranged one behind the other in the longitudinal direction, i.e. unfolded position, only a lateral, preferably inwardly—with regard to the load receiving means 14—directed folding of the sections 17b and 17c is possible. In the unfolded state of the longitudinal beam 17, the adjacent top surfaces of the sections 17a, 17b and 17c rest on one another. In order to increase the bearing surfaces, end plates (not illustrated) can be arranged on the ends of the tubular sections 17a, 17b and 17c.

In the vertical position, the longitudinal beam 17 which is formed behaves essentially as a single-piece beam in order thus to permit the load receiving means 14 to be guided in the direction of travel F and transversely to the direction of travel F of the rail vehicle 2. This foldable configuration of the longitudinal beam 17 has been selected in order, firstly, to be able to lower the load receiving means 14 as far as possible and, secondly, also to make it possible for the load receiving means 14 to be able to be lifted as far as possible in the direction of the rail vehicle 2 in spite of the relatively long longitudinal beams 17.

The manner of functioning of the lifting device 1 with sections 17b and 17c folded in the lifted state of the load receiving means 14 can be seen with reference to FIG. 3. A respective pin-shaped carry-along element 26, which can also be provided with a roller 27, is arranged at the respective upper ends of the second and third section 17b and 17c. Above the guide element 15, this carry-along element 26 is in engagement with a guide rail 28 which begins at the upper end of the guide element 15. In this region, the carry-along elements 26 of the central and upper sections 17b and 17c move consecutively into the guide rail 28 when the load receiving means 14 is lifted from the lowered position. The guide rail 28 initially has a straight section 28a which runs parallel to the lifting/lowering direction S. This first straight section 28a is adjoined by a curved section 28b which is directed inward, as seen with regard to the load receiving means 14, and is followed by a further straight and horizontal section 28c. However, in order to optimize the kinematics, this further horizontal section 28c may also run obliquely upward.

If a load receiving means 14 is lifted from the lowered position illustrated in FIG. 2 via the lifting gear 19, first of all the upper sections 17c of the longitudinal beam 17 move through the guide elements 15. At the same time, the carry-along elements 26, which are arranged at the upper end of the third section 17c, move into the first section 28a of the guide rail 28. When the upper end of the third section 17c of the longitudinal beam 17 reaches the region of the base frame 5 of the rail vehicle 2 and is therefore already situated in the vicinity of the rail 3, the curved section 28b of the guide rail 28 begins, with the result that, on further lifting of the load receiving means 14, the third sections 17c fold inward about their joint 25. Since a carry-along element 26 is likewise arranged at the upper end of the second section 17b of the longitudinal beam 17, this second section 17b also folds inward about the axis of the joint 24 when the carry-along element 26 reaches the curved section 28b of the guide rail 28. The load receiving means 14 can therefore be lifted far higher than with rigid longitudinal beams 17 with, at the same time, a low overall height of the lifting device.

When the load receiving means 14 is lowered from the lifted position into its lowered position, the second and third sections 17b and 17c of the longitudinal beam 17 are unfolded outward again into their vertical position via the guide rail 28 and the carry-along elements 26. In the lowered state of the load receiving means 14, the sections 17a to 17c of the longitudinal beam 17 therefore form a continuous longitudinal beam 17 running in the vertical direction.

It can furthermore be gathered from FIG. 4 that the horizontal section 28c of the guide elements 28 and therefore the upper sections 17b and 17c are not aligned precisely transversely to the direction of travel F, but are offset slightly obliquely in each case, so that the upper sections 17b and 17c can be guided past each other. An arrangement of the two longitudinal beams 17 which is offset slightly in the direction of travel F and is aligned transversely to the direction of travel F is also possible.

It can also be seen from FIG. 4 that a respective connecting rod 31 directed to the front and to the rear, as seen in the direction of travel F, is arranged centrally in each case on the base frame. This connecting rod 31 has the task of driving the rail vehicles 2 in "synchronous regions" in which a plurality of vehicles move at the same time successively through a manufacturing station. The connecting rod 31 is moved in this case via friction wheel driving stations (not illustrated). The individual rail vehicles can easily be kept at the same distance over the length of the connecting rod 31. The running-gear mechanisms 6a are in idling mode here.

FIG. 5 shows a sectional view of FIG. 2 along the section line I—I. It can be seen that the longitudinal beam 17 is designed as a tubular profile and is guided within the guide element 15 via four guide rollers 29 which are arranged in a plane and can be rotated about horizontal axes 33. In order to be able to set the guidance of the longitudinal beam 17 as precisely and with as little play as possible, the guide rollers 29 can be positioned in the direction of the longitudinal beam 17 via eccentric axes 30. It can also be seen that the guide element 15 grips only partially around of the round tubular longitudinal beams 17, preferably in a region of 230 to 310°, retaining a circumferential gap 32. This enables the cross beam 22 to be lifted into and also through the circumferential gap 22. The longitudinal beam 17 may also be of angular design in profile.

LIST OF REFERENCE NUMBERS

1 Lifting device
2 Rail vehicle
3 Rails
4 Suspension means
5 Base frame
6a Driven running-gear mechanisms
6b Non-driven running-gear mechanisms
7a Driving wheel
7b Running wheel
8 Guide wheels
9 Intermediate beam
10 Vertical axes
11 Vertical axes
12 Pivot arms
13 Electric drive
14 Load receiving means
15 Guide element
16 Struts
17 Longitudinal beam
17a, b, c Sections of 17
18 Load
19 Lifting gear
20 Traction means
21 Deflection pulley
22 Cross beam
23 Receiving means
24 Joint
25 Joint
26 Carry-along element
27 Roller
28 Guide rail
28a Vertical section of 28
28b Curved section of 28
28c Horizontal section of 28
29 Guide rollers
30 Eccentric axis
31 Connecting rod
32 Circumferential gap
33 Axes
34 Pivot axes
F Direction of travel
S Lifting and lowering direction

The invention claimed is:

1. A vehicle or vehicle part lifting device comprising:
a load receiving means adapted to support a vehicle or vehicle part;
a pair of horizontally spaced longitudinal beams arranged with the load receiving means and substantially aligned along a generally vertical lifting and lowering direction;
at least one linear guide element associated with each of the beams;
a base frame, the guide elements being supported from the base frame and laterally guiding the longitudinal beams and the load receiving means along the lifting and lowering direction;
a means for lifting and lowering the load receiving means;
each longitudinal beam comprising at an upper beam section and a lower beam section, the upper and lower beam sections of each of the beams having a tubular profile and comprising a tubular member and being collinear and aligned along the lifting direction when the load receiving means is lowered to its lowermost position, the upper and lower beam sections of each of the beams being interconnected by a hinge connection wherein the upper beam section of each of the beams is foldable relative to the lower beam section of each of the beams transversely to the lifting and lowering direction when the load receiving means is lifted above the lowermost position and the hinge connections are guided above the linear guide elements.

2. The lifting device as claimed in claim 1, wherein the base frame includes a guide rail, the guide rail guiding the upper beam sections to fold when the load receiving mean is lifted from its lowermost position.

3. The lifting device as claimed in claim 2, wherein the guide rail guides the upper beam sections to fold inwardly when the load receiving mean is lifted from its lowermost position.

4. The lifting device as claimed in claim 2, further comprising a carry-along element for each of the upper beam sections, the carry-along elements engaging the guide rail and guiding the upper beam sections to a generally horizontal position when the load receiving means is lifted to its uppermost position.

5. The lifting device as claimed in claim 4, wherein each of said carry-along elements comprises a roller which engages a respective guide rail.

6. The lifting device as claimed in claim 1, wherein the lower beam sections are connected to each other via a cross beam.

7. The lifting device as claimed in claim 6, wherein the linear guide elements extend partially around the respective longitudinal beams to thereby retain a gap, and wherein said cross beam can be moved through the gaps of the guide elements.

8. The lifting device as claimed in claim 6, wherein each of said longitudinal beams has a perimeter, each guide element engaging a respective longitudinal beams at its perimeter but extending only partially around the perimeter of the respective longitudinal beams to thereby form a gap, and the cross beam can be movable through the gaps of the guide elements.

9. The lifting device as claimed in claim 6, wherein the means for lifting is arranged on the base frame and is connected to the cross beam via a traction means.

10. The lifting device as claimed in claim 1, wherein the guide elements comprise guide rollers rotatable about axes aligned transversely to the lifting and lowering direction.

11. The lifting device as claimed in claim 10, wherein the guide rollers are positioned on the surfaces of the longitudinal beams via axes positioned about the surfaces of the longitudinal beams.

12. The lifting device as claimed in claim 1, wherein each of the longitudinal beams comprises three beam sections.

13. The lifting device as claimed in claim 12, wherein the three beam sections are colinear and connected via joints having pivot axes aligned transversely to the lifting and lowering direction.

14. The lifting device as claimed in claim 1, wherein the base frame comprises a rail vehicle which can be moved on at least two rails arranged next to each other and has running-gear mechanisms which are arranged on the base frame for engaging the rails.

15. The lifting device as claimed in claim 3, where the guide rail comprises a first straight section adjacent an upper end of a respective guide element, a curved section extending from the first straight section, and a second straight section extending from the curved section and being aligned essentially transversely to the lifting and lowering direction.

16. The lifting device as claimed in claim 1, wherein each of said beams includes a round tubular profile.

17. A vehicle or vehicle part lifting device comprising:
a load receiving means adapted to support a vehicle or vehicle part;
a pair of spaced apart longitudinal beams arranged with the load receiving means and substantially aligned along a vertical lifting and lowering direction when the load receiving means is lowered to a lowermost position;
at least one linear guide element associated with each of the beams, the guide elements guiding each of the beams in the lifting and lowering direction;
a base frame;
each of the longitudinal beams comprising an upper beam section and a lower beam section, the beam sections of each of the beams being collinear and aligned along the lifting and lowering direction when the load receiving means is lowered to its lowermost position, the upper and lower beam sections of each of the beams being interconnected by a hinge connection wherein the upper beam section of each of the beams is foldable relative to a lower beam section of each of the beams transversely to the lifting and lowering direction when the load receiving means is lifted above the lowermost position and the hinge connections are guided above the linear guide element, the lower beam sections being interconnected by a cross-beam; and
a lifting assembly for lifting and lowering the load receiving means relative to said base frame, said lifting assembly including a lifting mechanism mounted at the base frame and connected to the cross-beam by traction means.

18. The lifting device as claimed in claim 17, wherein the lifting mechanism comprises a lifting gear.

19. The lifting device as claimed in claim 17, wherein the traction means comprises a chain or a strap.

20. The lifting device as claimed in claim 17, wherein the traction means is mounted to the cross-beam intermediate said longitudinal beams.

21. The lifting device as claimed in claim 17, further comprising guide rails, the upper beam sections guided by the guide rails to fold inwardly wherein the upper beam sections are generally horizontally aligned when the load receiving means is lifted to its uppermost position.

22. The lifting device as claimed in claim 21, wherein each of the guide rails comprises a first straight section adjacent an upper end of a respective guide element, a curved section extending from the first straight section, and a second straight section extending from the curved section being aligned essentially transversely to the lifting and lowering direction.

23. The lifting device as claimed in claim 22, wherein the second straight sections of the guide rails are generally adjacent to each other.

24. The lifting device as claimed in claim 23, wherein the second straight sections are offset from each other so that the upper beam sections can be guided passed each other with the load receiving means is lifted to its upper most position.

25. The lifting device as claimed in claim 17, wherein each of the beam sections comprise a tubular member.

26. The lifting device as claimed in claim 17, wherein each of the longitudinal beams has a perimeter, each guide element engaging a respective longitudinal beams at its perimeter but extending only partially around the perimeter of the respective longitudinal beam to thereby form a gap wherein the cross-beam can move through the gaps of the guide elements.

27. The lifting device as claimed in claim 26, wherein each of the guide elements comprises guide rollers rotatable about axes aligned transversely to the lifting and lowering direction.

28. The lifting device as claimed in claim 17, wherein the base frame comprises a rail vehicle which can be moved on at least two rails arranged next to each other.

* * * * *